United States Patent Office 3,676,166
Patented July 11, 1972

3,676,166
PLASTICIZED SULFUR COMPOSITIONS
Rector P. Louthan, Bartlesville, Okla., assignor to
Phillips Petroleum Company
No Drawing. Filed Sept. 28, 1970, Ser. No. 76,210
Int. Cl. C09d 1/00
U.S. Cl. 106—241                                    21 Claims

ABSTRACT OF THE DISCLOSURE

The color stability of plasticized sulfur-containing compositions is improved by the addition of a viscosity control agent selected from the group consisting of 1,2,4-trichlorobenzene; biphenyl; naphthalene; o-dichlorobenzene; p-dichlorobenzene or xylene.

---

This invention relates to novel compositions of matter and methods for preparing such compositions.

Blending or reacting elemental sulfur with a suitable plasticizing material, such as an organic material which reacts at least in part with the sulfur, produces plasticized compositions having a variety of uses. The use of such compositions as road-marking materials, coatings for buildings, and other uses requiring durability is steadily increasing. Such compositions, because of the high viscosity of molten plasticized sulfur, are frequently difficult to apply. In addition, color stability is often poor, particularly in the case of white formulations. The use of materials such as halogenated polyphenyls, e.g., chlorinated biphenyls, has been effective in improving the viscosity. Judicious selection of filler and pigment additives has been effective in improving the color of white formulations. However, the addition of such materials to plasticized sulfur compositions tends to aggravate the viscosity problem, even in the presence of thinners such as the chlorinated biphenyl materials and, in addition, the color stability often leaves much to be desired. This dual problem, high viscosity and poor color stability, seriously inhibits the widespread use of these otherwise desirable compositions.

It has now been discovered that the viscosity and color stability of plasticized sulfur compositions can be substantially improved by adding to such compositions certain hereinafter described viscosity control (thinning) agents.

The viscosity control agents or thinning agents which are suitable for use in the practice of the invention are aromatic compounds having a boiling point within the range of about 250° to 500° F. Particularly preferred are aromatic and chlorinated aromatic compounds selected from the class consisting of 1,2,4-trichlorobenzene; biphenyl; naphthalene; o-dichlorobenzene; p-dichlorobenzene; xylene; or mixtures thereof. It is a particular feature of the invention that the viscosity control agents utilized herein are employed in the place of, rather than in addition to, such other previously used additives as the halogenated polyphenyls such as chlorinated polyphenyls, e.g., Aroclor compounds sold by Monsanto Company. The amount of viscosity control agent, while dependent in part on the chemical composition of the plasticized sulfur material and its additive loading, will generally be in the range of 1–50 parts by weight per 100 parts by weight of plasticized sulfur, excluding fillers or other additives. Presently, compositions containing in the range of 3–30 parts by weight of viscosity control agent per 100 parts by weight of plasticized sulfur are preferred. In any case, the resulting compositions should contain an amount of viscosity control agent sufficient to maintain the viscosity of the mixture at a level which permits the use of rapid application techniques. Suitable viscosities are within the range of from about 150 centipoises to about 5000 centipoises, measured at 250° F.

The plasticized sulfur-containing compositions which are treated in accordance with this invention comprise elemental sulfur and a sulfurized plasticizer comprising the mixture or reaction product resulting from contacting the elemental sulfur and certain plasticizer adjuncts. Generally, such sulfur-containing compositions comprise 100 parts by weight of elemental sulfur, including the amount of elemental sulfur reacting with said plasticizer adjunct, and from 3 to 30, preferably from 5 to 25, parts by weight of said adjunct.

Generally, the plasticized sulfur-containing compositions are prepared by contacting an excess of elemental sulfur and a plasticizer adjunct to form a sulfurized plasticizer containing at least some free sulfur. The sulfurized plasticizer is then admixed with sufficient additional elemental sulfur to provide plasticized sulfur-containing compositions as hereinbefore described having suitable adhesive and durability properties. If desired, the plasticized sulfur-containing compositions can be prepared in a single step by charging sufficient elemental sulfur and plasticizer adjunct to the reaction vessel to provide the plasticized sulfur-containing compositions hereinbefore described, thereby making unnecessary the step of admixing additional sulfur with the sulfurized plasticizer.

The plasticizer adjuncts which are reacted or admixed with elemental sulfur to form a sulfurized plasticizer are selected from the class consisting of aryl polysulfides, alkyl polysulfides, organic polythiols, chorinated polyphenyls, wood rosin, natural rubber, butyl rubber, olive oil, organic esters, alkyd resins and the like, and combinations of these.

Particularly applicable are the sulfurized plasticizers comprising the reaction product of elemental sulfur and one or more organic polythiols. Applicable polythiols are those having the formula $Y(SH)_n$, where $n$ is an integer selected from the group consisting of 2, 3, and 4, and is preferably 2; and Y is a radical having a valence of $n$ and containing 2–30, preferably 2–20, carbon atoms, each of said carbon atoms preferably having attached thereto not more than one SH group, said radical Y being selected from the group consisting of (a) radicals containing carbon and hydrogen only, (b) radicals containing carbon, hydrogen, and oxygen only, and (c) radicals containing carbon, hydrogen, and sulfur only. Radicals containing carbon and hydrogen only include saturated aliphatic, unsaturated aliphatic, saturated cycloaliphatic, unsaturated cycloaliphatic, and aromatic radicals, and combinations thereof. Radicals containing carbon, hydrogen and oxygen only include saturated aliphatic, unsaturated aliphatic, saturated cycloaliphatic, and unsaturated cycloaliphatic radicals and aromatic radicals, and combinations thereof, possessing hydroxy, ester, aldehydic, or ketonic substituents, or ether linkages; the total number of said substituents and linkages preferably not exceeding 2. Radicals containing carbon, hydrogen, and sulfur only include saturated and unsaturated hydrocarbyl radicals in which one or more methylene groups are replaced by sulfide linkages. A portion of the sulfur remains in elemental form rather than being chemically bonded within the organic polymer molecule.

Particularly preferred as sulfurized plasticizers are the materials comprising the reaction product of elemental sulfur and a mixture of 3-(2-mercaptoethyl)cyclohexanethiol and 4-(2-mercaptoethyl)cyclohexanethiol, e.g., as prepared by the method disclosed in U.S. Pat. 3,050,452. Such a mixture of isomeric dithiols can be used in crude form without removal of higher boiling substances, e.g., sulfides, or other contaminants produced during the synthesis of the dithiols.

The sulfurized plasticizers are preferably prepared in the absence of added solvent, although suitable solvents such as chloroform, carbon tetrachloride, benzene, toluene and xylene can be used. In a preferred embodiment, the sulfurized plasticizers are generally prepared by heating the plasticizer adjunct such as organic polythiol with elemental sulfur in an amount sufficient, and at a temperature sufficient, to provide a molten reaction product containing some free sulfur, the temperature of reaction being maintained within the range of about 50° to 500° F., preferably 75° to 400° F. The reaction temperature of 250° to 350° F. is particularly suitable. The reaction period varies, depending on the temperature and on the nature and condition of the compounds in the reaction system, but should be in the range of about 1 minute to about 2 days, usually being within the range of about 1 hour to about 6 hours. The pressure need be only sufficient to maintain the plasticizer adjunct and solvent, if used, substantially in the liquid phase. Hydrogen sulfide, which is evolved during the reaction, can be removed as it is formed. If a solvent is used, the solvent can be removed by volatilization upon completion of the reaction.

Especially preferred as plasticizers for elemental sulfur are the materials comprising the reaction product of elemental sulfur and a plasticizer adjunct which has been modified by adding thereto a modifying amount of an unsaturated acid or unsaturated acid anhydride. In this embodiment, the particular preferred plasticizer adjuncts are the organic polythiols, particularly the organic dithiols or the combination of a dithiol and a trithiol or tetrathiol. In this embodiment, the modifying agent employed is at least one unsaturated monoacid of the formula $$C_nH_{2n-1}COOH$$

or unsaturated diacid of the formula $C_nH_{2n-2}(COOH)_2$ or anhydrides thereof, wherein $n$ is an integer in the range of 2 to 20. Examples of unsaturated mono- and diacids and acid anhydrides suitable for use in the modification of the plasticizer are those selected from the group consisting of acrylic acid, maleic acid, crotonic acid, vinylacetic acid, oleic acid, 3-heneicosenoic acid, 2-docosendioic acid, 3,3-dimethyloleic acid, and the corresponding anhydrides thereof such as maleic anhydride and the like; acrylic acid is particularly preferred. The amount of modifying agent added to the plasticizer is generally in the range of from 1 to 10 parts per 100 parts by weight of the plasticized sulfur. The acid or acid anhydride modifier can be added at any time during the preparation of the plasticized sulfur composition. However, it is preferable to charge the acid or anhydride modifying agent during the preparation of the plasticizer. Thus, the modifying amount of the acid or acid anhydride is charged to the reaction system wherein the plasticizer adjunct is used for preparation of the plasticizer.

Alternatively, instead of part or all of the unsaturated acid or unsaturated acid anhydride, there can be employed a polysulfide compound containing at least one oxygenated radical, e.g., a polysulfide produced by the reaction of elemental sulfur with a mercapto compound selected from mercapto acids and mercapto alcohols, or by reaction of elemental sulfur with a thiol and a mercapto acid or mercapto alcohol.

If desired, a basic catalyst can be employed in the preparation of the sulfurized plasticizers. Catalysts such as amines, ammonia, and the oxides, hydroxides and carbonates of lithium, sodium, potassium, rubidium, cesium, magnesium, calcium, strontium, and barium can be used. The amines can be primary, secondary or tertiary, and they can contain saturated or unsaturated aliphatic or cycloaliphatic groups or aromatic groups, or combinations thereof in the molecule. Heterocyclic amines are included among the applicable amines. The concentration of basic catalyst is not critical, but the catalyst can be employed in an amount up to 5 parts by weight per 100 parts by weight of sulfur.

The temperature at which the plasticization is carried out is generally maintained within the range of about 50–500° F., preferably within the range of about 220–400° F. The time required for the plasticization varies, depending on the nature and concentration of the components in the system and the temperature employed, but should be within the range of about 1 minute to about 2 days, usually being within the range of about 10 minutes to about 6 hours. In a particularly preferred embodiment, the sulfurized plasticizers can be treated by a process comprising admixing certain high boiling inert solvents with the plasticizing agents and stripping out the solvent under reduced pressure. In accordance with this embodiment, essentially odor-free sulfurized plasticizers are prepared by the process comprising admixing certain high boiling inert solvents with the sulfurized plasticizer and distilling the mixture under reduced pressure at a temperature in the range of 250° to 500° F. to render the plasticizers substantially free of odor-causing contaminants. Preferably, the high boiling solvent is admixed with a solution of a plasticizer reaction mixture comprising sulfurized plasticizer, unreacted sulfur and unreacted plasticizer adjunct. According to this embodiment, at least a portion of the elemental sulfur and plasticizer adjunct continues to react to form additional sulfurized plasticizer while odor-forming bodies are simultaneously stripped from the reaction mixture together with the inert solvent. According to this embodiment, the high boiling solvent or stripping agent is added to the reaction vessel a finite time after the vigorous evolution of hydrogen sulfide ceases but while some hydrogen sulfide is still being evolved at a low rate. It has been found that the optimum time for admixing the inert solvent is on the order of about 3 hours after the initiation of the reaction between the plasticizer adjunct and the elemental sulfur.

The high boiling solvents which are useful as stripping agents for the removal of odor-causing contaminants from sulfurized plasticizers are hydrocarbon materials having an initial boiling point of about 300° F. and a relatively broad boiling point range which is generally on the order of 150° F. to 450° F. Thus, such hydrocarbons will have an overall boiling range within the range of about 300° F. to 750° F., preferably 300° F. to 600° F., and at least 300° F. to 450° F. Hydrocarbons having a narrow boiling range, e.g., 300° F. to 400° F., or an initial boiling point above 350° F. to 400° F., have been found ineffective in removing odor-causing contaminants from the sulfurized plasticizers. Hydrocarbon materials which have been found to be particularly useful stripping agents include kerosene and diesel fuel. The inclusion with the base stripping agent of auxiliary materials such as chlorinated polyphenyls and partially hydrogenated polyphenyls can improve the degree of removal of the odor-causing contaminants.

Generally, the hydrocarbon stripping agents can be added to the sulfurized plasticizer composition in a weight ratio of stripping agent to plasticizer in the range of 0.25:1 to 2:1. The distillation is effected at reduced pressures, such as under a vacuum or in the presence of an inert vapor, e.g., steam, such that the vapor pressure of the hydrocarbon stripping agent is in the range of about 1 mm. Hg to about 100 mm. Hg, preferably 1 to 20 mm. Hg. Deodorization is considered complete when the distillate overhead comprises a volume approximately equal to the volume of hydrocarbon stripping agents charged.

Plasticized sulfur compositions prepared according to this invention can have pigments added thereto and have sufficient whiteness and impact strength to make them ideally suitable for white marking compositions, e.g., in the marking of highways, streets, roads, airport landing strips and the like. Materials such as sand, glass beads and the like can be added to impart special properties sometimes desired in such marking compositions.

Any filler can be employed in the preparation of a filled plasticized sulfur-containing composition. In some instances, the fillers can also serve as extender pigments. If desired, the filler can be added to the plasticized sulfur-containing composition. Thorough mixing of the filler with the plasticized sulfur is readily achieved by stirring at temperatures at which the plasticized sulfur is molten. Alternatively, the filler can be added to the sulfur and/or to the plasticizer prior to plasticizing of the sulfur.

Fillers suitable for use in the plasticized compositions are selected from the class consisting of silica, bentonite, china clay, titanium dioxide, barium sulfate, barium carbonate, calcium carbonate, calcium sulfate, magnesium silicate, magnesium oxide, magnesium carbonate, graphite, carbon black, glass fibers, metal powders, asbestos, wood flour, cotton floc, alpha cellulose, mica, pyrophyllite, pumice, diatomite, hydrated alumina, calcium silicate and the like. The filler is present in the range from about 1 to about 100, preferably 10 to 70, parts by weight per 100 parts by weight of plasticized sulfur.

The following examples are illustrative of the invention.

EXAMPLES

A crude mixture of 3-(2-mercaptoethyl)cyclohexanethiol and 4-(2-mercaptoethyl)cyclohexanethiol was prepared by the method of Example I in U.S. Pat. 3,050,452.

A sulfurized plasticizer was prepared by heating for 3 hours at 300° F. a mixture of 14.0 parts by weight of the above crude mixture of (2-mercaptoethyl)cyclohexanethiols, 10.5 parts by weight of elemental sulfur, and 2.0 parts by weight of acrylic acid. The sulfurized plasticizer (25.1 parts by weight) was then deodorized by addition of 8.0 parts by weight of kerosene followed by distillation of the kerosene from the mixture maintained under a pressure of 5 mm. Hg for 1 hour in a bath held at 300° F. The resulting deodorized sulfurized plasticizer (25.1 parts by weight) was mixed with 76.9 parts by weight of molten sulfur, 12.5 parts by weight of viscosity control (thinning) agent, 40.0 parts by weight of amorphous silica, and 20.0 parts by weight of titanium dioxide, and the mixture was heated at 250° F. for 1 hour with vigorous stirring. The viscosity control agents employed and the melt viscosity of the corresponding formulations produced through the use of these viscosity control agents are given in Table I.

TABLE I

| Viscosity control agent: | Melt viscosity at 250–300° F. (Z–5 sec.) |
|---|---|
| HB–40 [a] | 18 |
| Aroclor 1232 [b] | 15 |
| Aroclor 1268 [c] | 24 |
| Dicyclohexyl phthalate | 80 |
| Cresyl diphenyl phosphate | 80 |
| Aromatic mixture rich in methylnaphthalenes | 33 |
| Santowax o, m, p [d] | 16 |
| Santowax R [e] | 15 |
| 1,2,4-trichlorobenzene | 14 |
| Biphenyl | 13 |
| Naphthalene | 12 |
| o-Dichlorobenzene | 12 |
| p-Dichlorobenzene | 10 |
| Reagent xylene [f] | 10 |

[a] Partially hydrogenated terphenyls.
[b] Chlorinated biphenyl containing 32 weight percent chlorine.
[c] Chlorinated biphenyl containing 68 weight percent chlorine.
[d] Mixture of isomeric terphenyls.
[e] Crude mixture of isomeric terphenyls.
[f] Mixture of o-, m-, and p- isomers.

The above formulations were sprayed on Transite tiles, and the coated tiles were subjected to accelerated weathering tests by the method of ASTM E 42–57, using an Atlas Electric Company Model 25–R Weatherometer equipped with a 2500-watt xenon light source, a temperature of 140° F., a relative humidity of 50 percent, and continuous exposure of the specimens. The Weatherometer tests indicated that compositions thinned with 1,2,4-trichlorobenzene; biphenyl; naphthalene; o-dichlorobenzene; p-dichlorobenzene; or xylene were each substantially more color stable than were those thinned with the other viscosity control agents tested. Additionally, as shown in Table I, use of these same six viscosity control agents, as contrasted with the other viscosity control agents employed, resulted in formulations of the lowest melt viscosity.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A plasticized sulfur composition comprising the mixture or reaction product of elemental sulfur and a plasticizer adjunct selected from the group consisting of aryl polysulfides, alkyl polysulfides, organic polythiols, chlorinated polyphenyls, wood rosin, natural rubber, butyl rubber, olive oil, organic esters, alkyd resins, and mixtures thereof; having incorporated therein a viscosity control agent selected from the class consisting of 1,2,4-trichlorobenzene; biphenyl; naphthalene; o-dichlorobenzene; p-dichlorobenzene; xylene; or mixtures thereof; wherein said composition comprises 100 parts by weight of elemental sulfur, 3–30 parts by weight of plasticizer adjunct and from 1–50 parts by weight of viscosity control agent per 100 parts by weight of plasticized sulfur.

2. A composition according to claim 1 wherein said plasticizer adjunct comprises at least one organic polythiol of the formula $Y(SH)_n$; wherein Y is an organic radical having a valence of $n$ and from 2 to 20 carbon atoms, said radical being selected from radicals containing carbon and hydrogen; carbon, hydrogen and oxygen; or carbon, hydrogen and sulfur; and $n$ is 2, 3 or 4.

3. A composition according to claim 2 having incorporated therein 1–10 parts per 100 parts by weight of plasticized sulfur of an unsaturated mono- or diacid of the formula $C_nH_{2n-1}COOH$ or $C_nH_{2n-2}(COOH)_2$ or anhydride thereof; wherein $n$ is an integer from 2 to 20.

4. A composition according to claim 2 further comprising from 1 to 100 parts by weight of inorganic filler per 100 parts by weight of plasticized sulfur.

5. A composition according to claim 2 wherein said viscosity control agent is naphthalene.

6. A composition according to claim 2 wherein said viscosity control agent is biphenyl.

7. A composition according to claim 3 wherein said viscosity control agent is naphthalene.

8. A composition according to claim 3 wherein said viscosity control agent is biphenyl.

9. A composition according to claim 2 having a reduced sulfur odor wherein said elemental sulfur and plasticizer adjunct mixture or reaction product has been mixed with an inert solvent stripping agent in a ratio of stripping agent to plasticizer in the range of 0.25:1 to 2:1 and has been treated by distillation under reduced pressure at a temperature in the range of about 250° to about 500° F. and said inert solvent stripping agent is a hydrocarbon which has an initial boiling point in the range of about 300° to about 350° F. and an overall boiling point range of about 150° to about 450° F.

10. A composition according to claim 9 wherein said inert solvent is kerosene.

11. A composition according to claim 9 wherein said viscosity control agent is naphthalene.

12. A composition according to claim 9 wherein said viscosity control agent is biphenyl.

13. A composition according to claim 9 having incorporated therein a modifying amount of an unsaturated mono- or diacid of the formula $C_nH_{2n-1}COOH$ or $C_nH_{2n-2}(COOH)_2$ or anhydride thereof; wherein $n$ is an integer from 2 to 20.

14. A composition according to claim 13 wherein said viscosity control agent is naphthalene.

15. A composition according to claim 13 wherein said viscosity control agent is biphenyl.

16. A composition according to claim 9 further comprising from 1 to 100 parts by weight of inorganic filler per 100 parts by weight of plasticized sulfur.

17. A composition according to claim 16 wherein said viscosity control agent is naphthalene.

18. A composition according to claim 16 wherein said viscosity control agent is biphenyl.

19. A composition according to claim 13 further comprising from 1 to 100 parts by weight of inorganic filler per 100 parts by weight of plasticized sulfur.

20. A composition according to claim 19 wherein said viscosity control agent is biphenyl.

21. A composition according to claim 19 wherein said viscosity control agent is naphthalene.

References Cited

UNITED STATES PATENTS

| | | | |
|---|---|---|---|
| 2,926,158 | 2/1960 | Martin | 260—79.1 |
| 3,434,852 | 3/1969 | Louthan | 106—287 SC |
| 3,447,941 | 6/1969 | Kane | 106—287 SC |
| 3,459,717 | 8/1969 | Signouret | 260—79 |
| 3,465,064 | 9/1969 | Signouret | 260—79 |

ALLAN LIEBERMAN, Primary Examiner

U.S. Cl. X.R.

106—218, 287 SC; 260—33.6 A, 33.6 R, 33.8 UA, 33.8 R, 40 R, 41.5 R, 726, 762